United States Patent Office 2,790,328
Patented Apr. 30, 1957

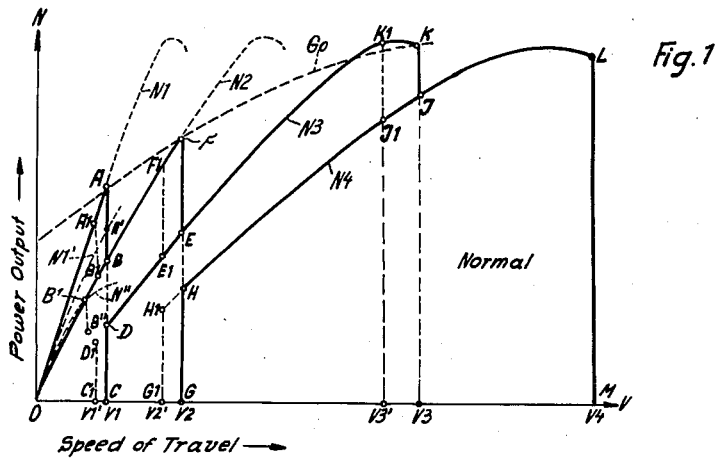
Fig. 1 — Normal
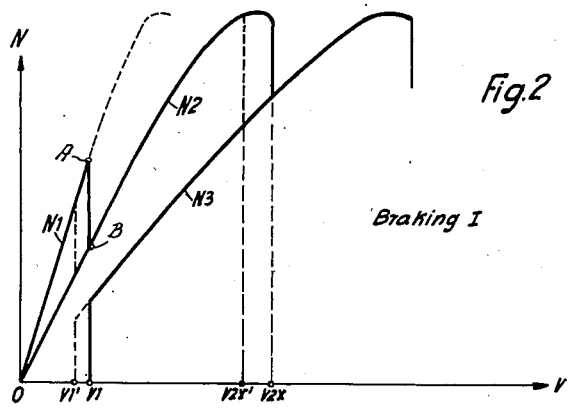
Fig. 2 — Braking I
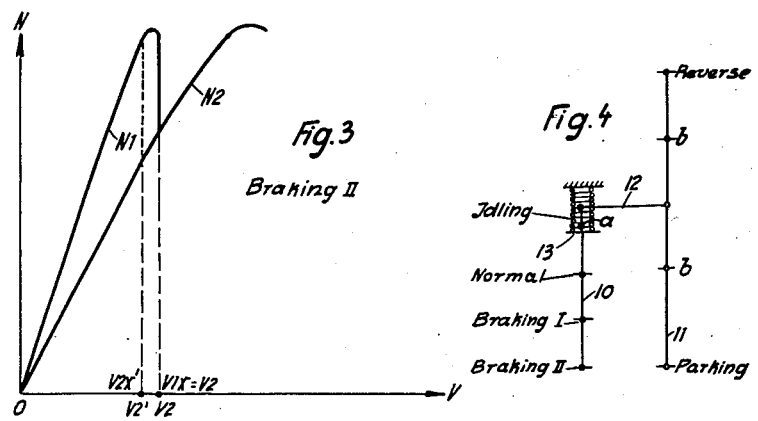
Fig. 3 — Braking II
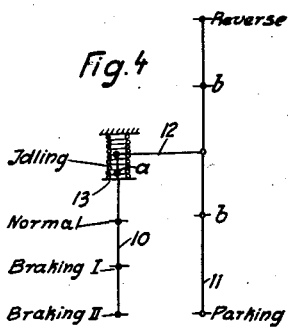
Fig. 4

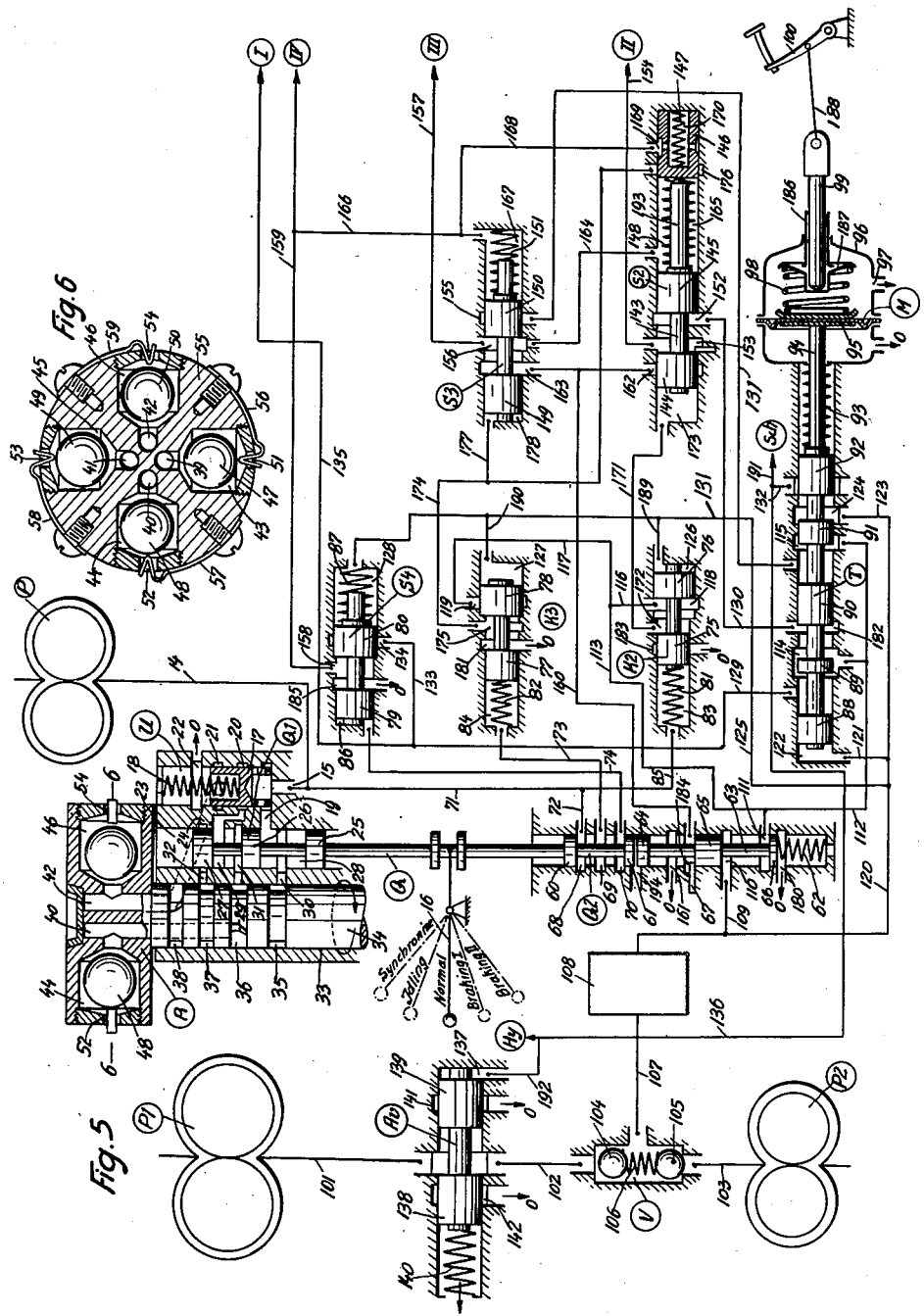

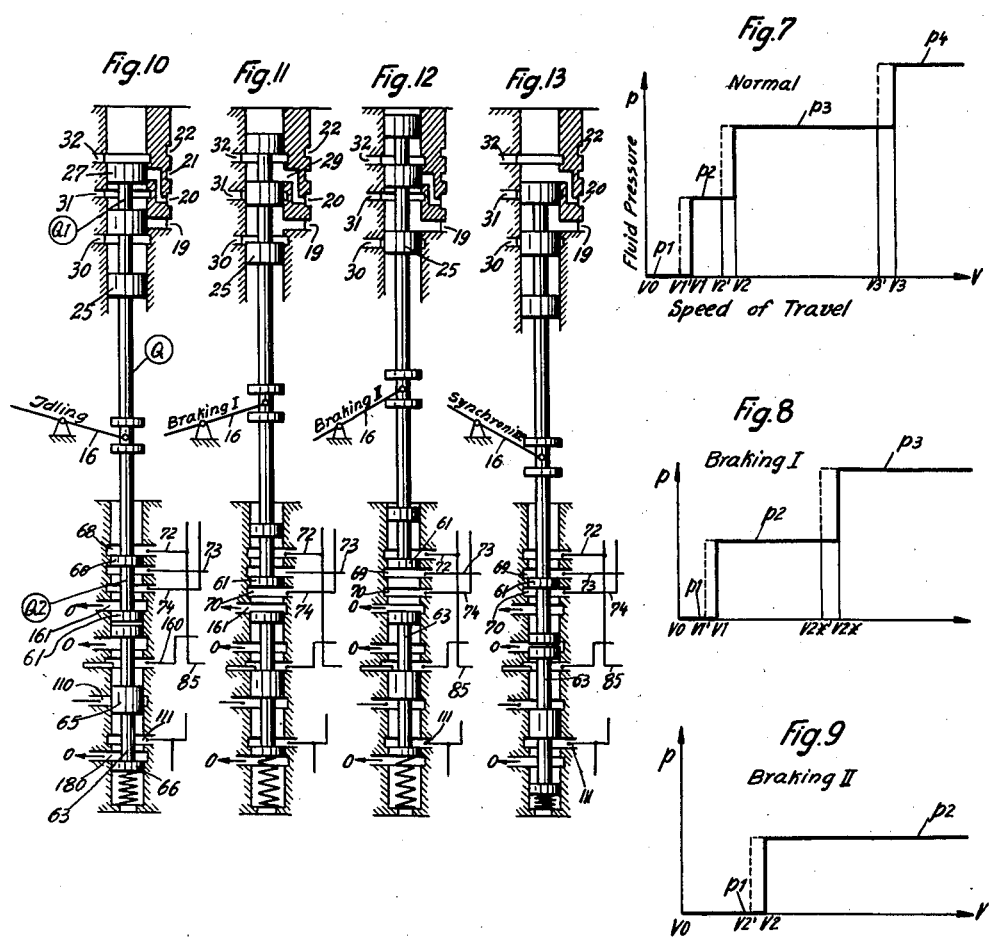

2,790,328

CONTROL SYSTEM FOR A VARIABLE MOTOR VEHICLE TRANSMISSION

Hans Joachim M. Förster, Stuttgart-Bad Cannstatt, Germany, assignor to Daimler-Benz Aktiengesellschaft, Stuttgart-Unterturkheim, Germany Application December 16, 1952, Serial No. 326,215

Claims priority, application Germany December 20, 1951

37 Claims. (Cl. 74—472)

My invention relates to a control system for a variable motor vehicle transmission and, more particularly, to a system for controlling a transmission of the type adapted to be set to any one of a plurality of ratios of transmission.

It is the primary object of my invention to provide a control system which will automatically control the transmission in a manner conforming to the best possible extent to all requirements arising under different conditions of operation. More especially it is an object of the present invention to provide a control system for the purpose indicated which will automatically shift the transmission from a certain ratio to the next higher speed ratio when the driver operates his vehicle within a predetermined range of speeds and in doing so depresses the accelerator, said control system being operative, however, when the speed of the vehicle exceeds a predetermined limit to effect such shift independently of the position of the accelerator. It is another object of the present invention to provide a control system which will automatically shift the transmission from a higher speed ratio to the next lower speed ratio irrespective of the position of the accelerator whenever the speed of the vehicle drops below a certain limit.

Further objects of the present invention will appear from the description of a specific embodiment thereof illustrated in the accompanying drawings, it being understood that such detailed description serves the purpose of illustration rather than that of limitation of the invention.

In the drawings:

Fig. 1 is a graph indicating the power outputs of the engine in dependence on the speed for different ratios of transmission with the control system set to "normal,"

Fig. 2 is a similar graph indicting the power outputs of the engine in dependence on the speed for different ratios of transmission with the control system set to the operation referred to hereinafter as "braking I,"

Fig. 3 is a similar graph indicating the power outputs in dependence on the vehicle speed for two different ratios of transmission, the latter being set to "braking II,"

Fig. 4 is a diagram indicating the various possible positions of the gear shift lever movable within two different paths, Fig. 5 is a diagrammatic sectional representation of the various elements of my novel fluid control system for a motor vehicle transmission showing the various elements of such control system and diagrammatically indicating the conduits connecting the same, the parts assuming the position in which the control system is set to "normal," the transmission being shifted to the second speed ratio, Fig. 6 is a cross section taken through the pressure step controller, an axial section of which is included in Fig. 5, Fig. 6 being the section taken along line 6—6 of Fig. 5, Figs. 7, 8 and 9 are graphs indicating the fluid pressure in dependence on the vehicle speed, such fluid pressure being subject to the pressure step controller shown in Figs. 5 and 6, Fig. 7 applying when the system is set to "normal,"

Fig. 8 applying when the system is set to "braking I," and

Fig. 9 applying when the system is set to "braking II,"

Figs. 10, 11 and 12 indicate two co-axial slide valves likewise shown in Fig. 5, Fig. 10 showing the position of the valve for setting the system to "idling,"

Fig. 11 showing the position of the valve for setting the system to "braking I," and Fig. 12 showing the position of the valve for setting the system to "braking II," and Fig. 13 showing the position of the valve for setting the system to "synchronize."

In Figs. 1, 2 and 3 graphs are shown in which the power output N is indicated in dependence on the speed V of the vehicle, Fig. 1 applying to the setting of the transmission to the first, second, third and fourth speed, Fig. 2 applying to the setting of the transmission to the first, second and third speed, and Fig. 3 applying to the setting of the transmission to the first and second speed, it being understood that the maximum power output at a certain speed depends on the effective ratio of transmission. N1 indicates the maximum power output with the transmission set to the first speed ratio; N2 indicates the maximum power output with the transmission set to the second speed ratio; N3 indicates the maximum power output of the transmission being set to the third speed ratio, and N4 indicating the maximum power output of the transmission being set to the fourth speed ratio.

According to the invention the control system to be described hereinafter may be set to three different conditions, to wit (1) To "normal" which is used under normal driving conditions, (2) To "braking I" which may be used in city traffic and while coasting downhill where it is desired that the engine exert a certain braking effect on the vehicle, and (3) To "braking II" which is used under similar but more extreme conditions than the previous setting.

When the transmission has been set to "normal" the novel control system functions in such a manner that the transmission may be automatically shifted from one ratio of transmission to the other ratio of transmission whenever the speed of the vehicle borders the noise limit G0 or is below said limit, the latter constituting a limit above which the motor noise is louder than the noise produced by the wheels of the vehicle and the body thereof and, therefore, gives the passengers an uncomfortable sensation as though the engine were racing at an excessive number of revolutions.

When the vehicle travels with the transmission set to the first speed ratio under full power, the speed V of the vehicle will increase from 0 to V1 and the power output of the transmission will increase from the point 0 up to the point A. As soon as the speed V1 has been attained, the power output amounting to A, the control system to be described hereinafter functions to automatically shift the transmission to the second speed ratio resulting in a reduction of the power output B. When the driver, however, in accelerating the vehicle from 0 to V1 does not fully open the throttle, but opens the same partially only thus causing the power output to increase from 0 to A', as indicated by the dotted line N1', the control system will be operative to perform the shifting operation at the point A'. With an even smaller power output of the engine, for instance as indicated by the curve N1", the novel control system will shift the transmission from the first speed ratio to the second speed ratio as soon as the power output curve intersects at B', the full power curve N2 representing the power output of the transmission shifted to the second speed ratio. Whenever in the diagram of Fig. 1 the power output and the speed are defined by a point moving through the curve N2, the shifting operation takes place. Therefore, this curve will be referred to hereinafter as the shifting-up curve. If the driver would maintain the accelerator in its position, the power output would drop upon the shifting operation to a correspondingly low point located within the area of the second speed ratio, e. g. to B". Since the driver, however, will instinctively fully depress the accelerator upon the gear shifting operation, a drop of power is practically avoided.

The first speed ratio area, i. e. the area including all of the points indicating the vehicle speed and the power output attainable with the transmission being set to its first speed ratio, is defined by the points 0—A—B, the shifting operation taking place whenever the power output curve intersects the line 0—B—A.

Similarly, the transmission is shifted from the second speed ratio to the third speed ratio whenever the curve representing the power output in dependence on the vehicle speed intersects the line C—D—E—F which is offset twice. Whenever the vehicle is operated at a speed and at a power represented in Fig. 1 by a point located to the left of this line C—D—E—F, the novel control system will set the transmission to the second speed ratio. Whenever the power output and/or speed of the vehicle is so altered as to be represented by a point in Fig. 1 moving to the right of the line C—D—E—F, the transmission will be shifted to the third speed ratio. The point F is located on the full power graph N2 of the second speed ratio, the same being the curve indicating the power output with the throttle being fully open, to wit the highest attainable power output in second speed. Here again point F is located on or below the noise limit G0. Similar considerations apply to the gear shifting operation shifting the transmission from third to fourth speed. Therefore, such gear shifting operation occurs whenever the power output and/or the vehicle speed change in such a manner that the point representing the same would pass through the line G—H—I—K.

As will appear from Fig. 1, the boundaries of the different ratio areas in the graph are preferably so correlated that the maximum speed V1 of the first ratio area coincides with the minimum speed V1 of the third ratio area. Similarly, the maximum speed V2 of the second ratio area 0—F—E—D—C coincides with the minimum speed V2 of the fourth ratio area G—H—I1—I—V4.

As a result, there are at least two different ratios of transmission available, a higher ratio and a lower ratio, for the operation of the vehicle at any particular speed between zero and V3. Thus, when the vehicle is driven at a speed higher than V1 and lower than V2 the transmission will be set by the novel control system to the second ratio if the point indicating the power output is located within the area D—B—F—E, or will be set to the third speed ratio if the point indicating the power output is located within the area C—D—E—G. Since the shifting-up line, i. e. the boundary between two adjacent ratio areas, coincides with the full power graph N2, N3 or N4 of the next higher ratio, the novel control system includes as an element means responsive to the vacuum produced in the intake manifold of the engine, such vacuum being substantially proportional to the driving torque exerted by the engine upon the transmission. Thus, the shifting-up line constitutes a line of constant intake vacuum which below the noise limit G0 corresponds substantially to the torque characteristic of the engine. Therefore, the intake vacuum is one of the controlling factors of the novel system. It may be used, for instance, for controlling the fluid pressure employed to engage clutches in the transmission. Preferably, the different ratios of transmission constitute a geometrical progression. In that event, the critical intake vacuum resulting in the gear shifting operation will be the same for all ratio areas.

Once the transmission has been shifted from one ratio to the next higher speed ratio, it will not be shifted back unless the speed drops below the lower limit of the associated speed-power area, such lower limit being preferably slightly displaced with respect to the lower limit that was previously effective during the operation of shifting the transmission from the lower ratio to the next higher ratio whereby a hysteresis effect will be attained which prevents the transmission from being continually shifted to and fro when the vehicle is operated at a speed close to the speed limit. This will now be explained with reference to an example. Let us assume that the transmission has been shifted from the second speed ratio to the third speed ratio, the speed exceeding V2. Then, when the speed drops, the transmission will not be shifted back to the second speed ratio unless the speed decreases below V2' which is slightly less than V2.

Should the driver operating the vehicle within a certain range of speed wish, however, that the transmission be shifted to the next lower speed ratio, he may do so by a suitable manipulation of the control system, for instance by the so-called "kick-down," i. e. by depressing the accelerator pedal or other power control member beyond the full load position.

Since in normal service the period of operation of the transmission in the first speed ratio is but very short, and since preferably a free-wheeling clutch is operative to transmit the lowest speed, and since the initial acceleration of the vehicle attainable with the second speed ratio of the transmission is fully sufficient, a lower limit speed for the second ratio area is preferably dispensed with, such area reaching down to the point 0 whereby the second speed area is extended to C—D—E—F—B—0. Nevertheless, the driver operating the vehicle at a power and a speed represented by a point located within the area V1—D—E—F—B—0 is able at any time to shift the transmission to the first speed ratio by the "kickdown" manipulation of the accelerator pedal.

The same applies to the operation of the vehicle at all other ratios of transmission. Thus, the driver may start the vehicle in the second speed ratio unless he has shifted the transmission to first speed by the kick-down of the accelerator. In this manner, the following advantages are secured:

When the vehicle is idling the hydrodynamic clutch will transfer a definite, even though limited, torque producing a tendency of the vehicle to creep. That tendency is considerably reduced when the transmission is set to the second speed ratio while the engine is idling and the vehicle is at a stop. Moreover, under normal conditions the operations required for shifting from first to second speed or from second to first speed are saved. The elimination of such operations is highly desirable, particularly inasmuch as they are very likely to produce shocks owing to the considerable jump in driving power.

Fig. 2 illustrates the conditions of operation of the vehicle ensured by the novel control system when the same has been set to the "braking I" condition. In this condition of the system the transmission will not be automatically set to the fourth speed ratio, no matter how fast the vehicle may be driven. If the vehicle was previously driven with the transmission set to the fourth speed ratio, the setting of the control system to "braking I" which may be effected by the driver in view of traffic or road requirements will immediately cause the transmission to be shifted back to the third ratio. Since for any speed of the vehicle two ratios of transmission only are available, it is unavoidable that with the setting of the control system to "braking I" the vehicle speed may increase beyond the noise limit with both the third speed ratio and the second speed ratio. Therefore, the power output graph N2 extends up to the minimum number of rotations of the engine and to a vehicle speed of V2x. The control system will be conditioned for the restoration of the transmission from the third speed ratio to the second speed ratio at a speed V2x'. Whenever the vehicle speed drops below that limit the driver may shift the transmission arbitrarily to the second speed ratio by kicking down the accelerator pedal. The shift of the transmission from the first gear ratio to the second gear ratio and vice versa is controlled in the same manner as described above with reference to the "normal" condition of the control system. Therefore, the first gear ratio will be available for the speeds and power outputs included in the area 0—A—B.

Fig. 3 illustrates the operating conditions of the control system when the same has been set to "braking II". In this event the control system will set the transmission either to the first speed ratio or to the second speed ratio, but not to the third or the fourth speed ratio. Therefore, in this condition the control system permits safe operation of the vehicle coasting on steep downgrades, the engine acting as a brake limiting the speed of the vehicle. With this setting of the control system both the first speed ratio and the second speed ratio may be used up to the full power output of the engine indicated by the curves N1 and N2. The automatic shifting-up boundary for the first speed ratio condition is extended up to a vehicle speed of V1x which preferably corresponds to V2. The shifting-down boundary in this case is located at a lower speed V2x'. When the control system conditioned for "braking I" is set by the driver to "braking II", such setting operation preferably performed by means of the customary control lever mounted on the steering column causes the transmission to be automatically shifted to the second speed ratio should it have been set to the third ratio before. The condition "braking II" has been found to be particularly useful under driving conditions requiring a maximum of acceleration of the vehicle in the first gear condition or a maximum of engine braking in the second gear condition.

As will appear from the foregoing explanation of the function of the novel control system, the essential features of the present invention are the following:

The operation of shifting the transmission from one speed ratio to the next higher speed ratio is automatically effected between a lower speed limit and an upper speed limit in dependence on the torque of the engine, the transmission being so shifted at any rate, i. e. irrespective of the torque of the engine, when the vehicle speed exceeds the upper limit. Preferably, the shifting-up operation is automatically effected in dependence on the driving torque, whereas the shifting-down operation is effected either automatically as a result of a reduction of the vehicle speed below a certain lower limit, or as a result of a manipulation by the driver performed while the vehicle is travelling within the speed limits of the range of speed coordinated to the particular ratio then effective. More particularly, such manipulation consists in kicking down the accelerator pedal beyond its full power position.

The novel control system may be conditioned for three different functions, to wit for "normal," for "braking I," and for "braking II." In "normal" the control system may shift the transmission to any one of the available ratios, for instance to any one of four speed ratios. In "braking I" the control system may shift the transmission to any one of a lower number of ratios, e. g., to any one of three speed ratios. In "braking II" the control system may set the transmission to any one of a still smaller number of ratios, e. g., two speed ratios. Preferably, the control system, when conditioned by the driver for a more limited function, is operative to increase the speed limit for the shifting-up operation at which the transmission is shifted to a higher speed ratio.

The present invention is a valuable contribution to the art involving the following advantages:

(1) The shifting-up boundary, such as C—D—E—F or G—H—I—K, may be so chosen that the transmission will be shifted to the next higher speed ratio whenever the same permits the same power output to be performed with a reduced fuel consumption (with the same or with another throttle adjustment of the engine). Where the engine is of the Otto-type in which a fuel mixture is compressed and ignited, the shifting-up boundary, such as C—D—E—F or G—H—I—K, substantially coincides with the full power characteristic of the following speed ratio.

In engines of the Otto-type, the full power characteristic of the next speed ratio is substantially identical with a characteristic denoting constant intake vacuum for the ratio of transmission effective at the time. In diesel engines in which the fuel is injected into a compressed air charge the full power characteristic of the next ratio substantially coincides with a characteristic denoting constant fuel control adjustment. Therefore, the intake vacuum or the position of the fuel control member of the diesel fuel injection pump may be used as determining the shifting-up boundary. With an engine of the Otto-type for instance, the characteristic indicating constant intake vacuum, when used as a controlling factor, has the result that the shifting-up operation takes place at a vehicle speed which is the higher the wider the throttle will be opened. Therefore, the ratio areas, such as 0—F—E—D—C and C—D—E—K—I—H—G in Fig. 1 can be determined solely by determining the speed limits at which the shifting operations shall take place.

(2) The automatic shifting-down operation can likewise take place in dependence on the intake vacuum of the engine. It appears preferable, however, to restrict the conditions resulting in the shifting-down operation to a reduction of the vehicle speed below a lower limit which is preferably so chosen that below said limit a lower fuel consumption is attainable with the lower speed ratio. Said lower limit of the speed coordinated to the shifting-down operation shall be chosen at any rate below the shifting-up limit in order to avoid undesirable oscillations of the control system.

While the control system keeps the transmission set to the second, third, fourth, or a higher speed ratio, it is conditioned at any time to be rendered operative by a manipulation of the driver, such as the kicking down of the accelerator pedal, to shift the transmission back to the next lower speed ratio. In such event, it is the control system and not the driver that determines in dependence on the speed of the vehicle which speed ratio is to be set up. With such function of the control system the fuel consumption may be reduced to a minimum, because a full opening of the throttle will not always immediately result in the full power output of the engine which otherwise would only too often be used inadvertently.

The speed limits of the condition of the control system for the performance of the shifting-down operation are preferably located somewhat below the corresponding shifting-up speed limit in order to prevent undesirable oscillations of the control system.

(3) The speed limits indicated in Fig. 1 representing the function of the control system when conditioned for "normal" may be so chosen that the noise of the engine will always be smothered by the other noises incidental to the operation of a motor vehicle, such as those produced by the wheels and by the wind. Therefore, the power output will always remain below the noise limit G0. By conditioning the control system to "braking I" or "braking II," the driver may at any time make the full power output of the engine available independently of the noise limit if he so desires.

(4) The chance available to the driver of conditioning the transmission of the "braking I" operation or the "braking II" operation affords a possibility to increase the power output and the possible braking effects so as to suit road and traffic conditions. By so conditioning the control system the driver may use a low speed ratio up to the full power output of the engine since the transmission will no longer be shifted automatically to a higher speed ratio. Hence, the low speed ratios, for instance three speed ratios, may be utilized to produce a braking effect by the engine on downgrade travel. Thus, the vehicle may be driven with the first speed ratio or the second speed ratio up to the maximum number of R. P. M. of the engine which is sometimes desirable to overcome extreme upgrades of the road or to attain a maximum acceleration or a maximum braking effect of the engine.

(5) Preferably, the speed limits for the shifting operation are so chosen that at any speed of the travel of the vehicle (under certain circumstances except for the highest range of speeds) two ratios of transmission are available, the control system being operative to automatically shift the transmission to the higher one of the two ratios, whereas the restoration of the transmission of the lower ratio preferably depends on the kick-down of the accelerator pedal by the driver beyond the full power position of the pedal. Under normal conditions the higher one of the two ratios is effective resulting in a low fuel consumption. Where the traffic conditions or road conditions require a frequent use of the second speed ratio, the driver may condition the control system to "braking I" thereby increasing the power area available for small speeds. For limiting the automatic function, such as the automatic shifting-down, to the second speed ratio for the purpose of braking the vehicle, the driver may condition the control system to "braking II." Whenever the control system has been conditioned for "braking I" or "braking II" the engine may race at full speed which offers advantages in cases of emergency, for instance in event of a failure of the brakes. The control system may be so devised, however, that even if set to "braking I" or "braking II" the transmission will be shifted to the next higher speed ratio in event of excessive R. P. M. of the engine.

Prior control systems for motor vehicle transmissions adapted to be set to any one of four different ratios could be set to a normal condition and to a braking condition in which the transmission was set to the second speed ratio. Since, however, most of the downgrades have an inclination of less than ten per cent. the third speed ratio is sufficient as a braking speed ratio. The limitation to the second speed ratio as a braking ratio reduces considerably the usefulness of the automatic control system, because either the friction brakes of the wheels must be used or the driver must alternatively set the control system to "normal" and to "braking" or he must give gas with the transmission shifted to second. Contrary to such prior art the present invention affords a much better utilization of the various ratios of transmission and conforms much better to the road and traffic conditions without in any way encumbering the operation of the vehicle and without increasing the cost of manufacture.

Moreover, the invention relates to a pressure step controller, preferably in the form of a centrifugal governor controlling various super-pressure valves or a super-pressure valve having a plurality of discharge cross sections. Finally, the invention relates to the combination with such a pressure step controller in connection with a conditioning valve which conditions the control system to "normal," "braking I" or "braking II" and is operative when so set to selectively connect the gear shifting means to a source of pressure fluid or to disconnect the same therefrom. Preferably, the pressure step controller is constituted by a centrifugal governor including a plurality of flyweights acting at the same time as valve bodies adapted to seal discharge openings for the discharge of conduits which are rendered effective successively.

Preferably, a manual setting lever adapted to condition the control system to "normal," "braking I" or "braking II" is so mounted on the steering column of the vehicle as to be capable of being rocked within an upper plane or within a lower plane. In one of the two planes the lever may assume three positions, one for reverse, another for idling, and a third one for parking. Further features of the present invention involve the use of pilot valves and gear shift valves in connection with the conditioning valve and a pressure controller. The control system is operated by fluid which is under pressure except in the idling condition, and by fluid pressure available even in the idling condition, both fluid pressures being derived from the same source and being subject to the same control by the pressure controller.

A primary pump geared to the engine and a secondary pump geared to the outgoing shaft of the transmission may be used. In this event, a valve may be provided for the primary pump, said valve being controlled by the pressure controller, preferably through the intermediary of a duct leading to the lubricating points and to the hydrodynamic clutch, said valve disconnecting the primary pump as soon as the ducts leading to the clutch-actuating rams have been opened by the pressure controller and particularly when the secondary pump becomes operative. The valve may serve at the same time as the super-pressure valve for the lubricating pressure.

In Figs. 4 to 13 the novel control system having the function described with reference to Figs. 1, 2 and 3 is shown more or less diagrammatically, it being understood that the control system is applicable to a transmission of the type disclosed in my earlier patent application Serial No. 245,131 filed on September 5, 1951, now Patent No. 2,756,616, dated July 31, 1956, said transmission including a valve housing mounted on the transmission casing and adapted to accommodate the various valves illustrated in Fig. 5, and also including a primary pump P1 geared to the incoming shaft of the transmission driven by the engine, and a secondary pump P2 geared to the outgoing shaft of the transmission and thus to the wheels of the vehicle. The transmission, moreover, includes four rams for the actuation of clutches, each ram comprising a piston and a cylinder. Ram I controls a toothed clutch to thereby render a one-way clutch operative between the outgoing shaft of the transmission and the slowly revolving first gear. Since at any time such first gear can be overtaken by the outgoing shaft when the latter is driven through any one of the other gear clutches II, III, IV, the toothed clutch operable by ram I may be kept in engaged condition as long as the vehicle is travelling forward at any speed. Some of the elements to be described hereinafter form the subject matter of my co-pending application Serial No. 320,032 filed on November 12, 1952, which corresponds to and claims the invention priority of a German patent application filed Daimler-Benz Aktiengesellschaft, a joint stock company organized under the laws of Germany, on November 16, 1951. For the purposes of the present disclosure reference may be had to such co-pending application, and the disclosure thereof is to be considered part of the present disclosure.

In Fig. 4 I have diagrammatically illustrated the various possible positions to which the hand lever may be set for conditioning the control system, a slotted guiding member being employed to guide such hand lever, said guiding member having two guideways 10 and 11 connected by a transverse guideway 12. The guideway 10 determines the setting positions for conditioning the system to "idling," "normal," "braking I," and "braking II," whereas the second guideway determines the positions of the hand lever for conditioning the control system to "reverse" and "parking." Preferably, means are provided to temporarily brake and stop the driven member of the hydrodynamic clutch whenever the lever passes transitional positions when being moved to "reverse" and to "braking," such means having been disclosed in my last mentioned co-opending application. Preferably, such braking and stopping commences when the lever passes through the point a and ends when the hand lever passes through one of the points b on its way from the guide path 10 to the guide path 11.

For sake of simplicity the valve Rh disclosed in my last mentioned co-pending prior application has been omitted in Fig. 6. It is to be understood, however, that such valve Rh which serves the purpose of producing the temporary braking effect just referred to and also serves to de-energize all of the rams including ram I is, in fact, included in the control system though not specifically referred to hereinafter.

A resilient stop 13 is preferably provided in the guideway 10. Therefore, the driver when shifting the setting lever farther than the "idling" position must overcome the resilient resistance offered by the stop 13 before the shifting lever may be moved through guideway 12 into the guideway 11. In this way, an inadvertent setting of the lever from "idling," to "reverse" or "parking" is obviated.

In Figs. 5, 10, 11, 12 and 13 a lever 16 is shown which is operable by the hand lever heretofore referred to and may be moved the same to any one of the five positions "idling," "normal," "braking I," "braking II," and "synchronize," the five positions being shown in Fig. 5. The conditioning slide valve Q includes an upper section Q1 adapted to control the pressure step controller R and a lower portion Q2 adapted to control a plurality of pilot valves and gear shifting valves. A source of operating fluid is constituted by a pump P which feeds in proportion to the speed of the vehicle and is preferably geared to the universal shaft of the vehicle or to the outgoing shaft of the transmission. From P the fluid is fed through conduit 14 and a branch conduit 15 to a super-pressure valve U, and is fed through a branch conduit 71 in a manner to be described later to the conditioning section Q2 of the valve Q and thence to the pilot valves. The super-pressure valve U comprises a valve member 17 slidably guided in a cylindrical bore of the valve casing and urged downwardly by a spring 18 towards its lower end position. The valve controls a plurality of discharge ports, such as ports 20, 21 and 22. The lower end of the valve member 17 is hollow and has holes constituting a permanent communication between conduit 15 and a port 19. The ports 19 and 20 open into a cylindrical bore 23 accommodating the upper section Q1 of the conditioning valve, whereas port 21 is connected by a duct 24 to one of the four chambers of the pressure step controller R. The port 22 finally is put on exhaust communicating with a return line not shown.

The section Q1 of the conditioning valve includes three piston members 25, 26 and 27 connected by the valve stem in spaced relationship, the spaces between the piston members being denoted at 28 and 29. The cylindrical bore 23 is provided with peripheral grooves communicating with conduits 30, 31 and 32 leading to a cylindrical bore 33 accommodating the shaft 34 of the pressure step controller R. The shaft 34 is preferably geared to the outgoing shaft of the transmission to be driven at a speed proportional to that of the travel of the vehicle. The shaft 34 is provided with four peripheral grooves 35, 36, 37 and 38 individually connected with chambers 43, 44, 45 and 46 by longitudinal ducts 39, 40, 41 and 42 provided within the shaft 34, as will appear from Figs. 5 and 6. The chambers 43, 44, 45, 46 are provided within a head integral with shaft 34 being distributed about the axis of rotation of the head and being individually connected by radial bores with the longitudinal ducts 39, 40, 41 and 42, as shown in Fig. 6. Balls 47, 48, 49 and 50 are accommodated within the chambers, the latter being closed by peripheral lids having a threaded engagement with the head, the outer face of such lids being flush with the periphery of the head. Each lid is provided with a central bore constituting the outlet 51, 52, 53, or 54 respectively, of the chamber controlled by the ball acting as a valve member. Leaf springs 56, 57, 58, 59 fixed to the periphery of the head and positioned in contact therewith have bent ends extending through the openings 51, 52, 53 and 54 into engagement with the balls tending to maintain same in spaced relationship from the lids, as shown in Fig. 6. When the vehicle is in motion, the headed shaft 34 constituting the pressure step controller R revolves subjecting the balls 47, 48, 49 and 50 to a centrifugal force tending to press the balls upon the lids thereby closing the outlets 51, 52, 53, 54. The leaf springs 56, 57, 58 and 59 are biased, the bias being so differentiated that as the rotary speed increases, first ball 47 and thereafter successively balls 48, 49 and 50 will close the associated outlet. If desired, such outlets may have different diameters.

When the vehicle is at rest or is travelling at a low speed, the fluid fed by pump P through pipes 14 and 15 enters the bottom of valve member 17 and thence through the holes provided therein flows through port 19, space 28, port 30, peripheral groove 35, and longitudinal duct 39 communicating therewith to the chamber 43 of the controller R. Since the outlet 51 of this chamber is open, the fluid may freely escape. Thus, a comparatively low pressure only will be maintained in pipe 14. As the speed increases beyond a certain limit, however, the centrifugal force acting on ball 47 will overcome the bias of spring 56 and will close opening 51. As a result, the pressure acting on the bottom of valve member 17 will lift the same contrary to the tendency of spring 18. The pressure of valve member 17 exerted upon the fluid increases the pressure of the same accordingly. This pressure will have reached a certain limit when the valve 17 uncovers the port 20 constituted by a peripheral groove in the cylindrical bore of the valve casing. Through this port the pressure oil escapes via space 29, port 31, peripheral groove 36 of shaft 34, longitudinal conduit 40, the chamber 44, and the outlet 52. Upon a further increase of the rate of travel of the vehicle, ball 48 will be caused by the increased centrifugal force to seal the outlet 52 whereupon the fluid fed through pipe 14 will further raise valve member 17 thus increasing the pressure of the fluid until the valve member will uncover the peripheral groove 21 wherefrom the oil will now escape through duct 24, peripheral groove 38, longitudinal duct 42, and chamber 46 through outlet 54. On a further increase of the speed, ball 50 will seal outlet 54. As a result, valve member 17 will be further lifted thus increasing the pressure prevailing in line 14 until the valve member 17 will uncover the outlet port 22 permitting the surplus oil to be discharged.

In this manner, the controller R is operative to fix the pressure prevailing in line 14 to one of four different amounts in dependence on the speed of travel of the vehicle.

The function of the pressure step controller R is indicated in Fig. 7, it being understood that the function so far described with reference to Fig. 5 is obtained when lever 16 is set to "normal." When the speed of the vehicle is between zero and V1, the four oulets 51, 52, 53, and 54 are open and the pressure $p1$ is practically zero. When the speed increases beyond V1, the closing of outlet 51 increases the fluid pressure to $p2$. When the speed increases beyond V2, the closing of outlet 52 increases the fluid pressure to $p3$. When the speed increases beyond V3, the oulet 54 will be closed raising the pressure to $p4$.

The function of the controller R when lever 16 has been set to "braking I" or "braking II" will be described later in connection with the function of the pilot valves and the gear shift valves.

The portion Q2 of the conditioning valve Q is rigidly connected with the portion Q1 and is provided with two spaced pistons 60 and 61 slidably guided within a bore of the valve casing. A co-axial slide valve 63 provided with spaced piston sections 64, 65 and 66 is slidably accommodated in the same bore. Moreover, the latter houses a spring 62. This spring bears against an end shoulder of the bore which opens into the atmosphere and bears against the slide valve 63 tending to move the same into the position shown in Fig. 5 in which the piston 65 bears against a stop 67 projecting into the bore.

The valve portion Q2 cooperates with internal grooves 68, 69, and 70 provided within the bore and being so spaced as to be positioned between the piston 60, 61 when the valve Q is set to "normal" as shown in Fig. 5. The groove 68 communicates via lines 71 and 72 with the pressure line 14 of pump P, whereas the grooves 69 and 70 are individually connected to pipes 73 and 74 leading to valves K3 and S4.

There are provided two pilot valves K2 and K3 and three gear shift valves S2, S3 and S4. The gear shift valve S4 performs the additional function as a pilot valve. The valves K2 and S2 control the actuation of the ram II for the setting of the transmission to the second speed ratio. The valves K3 and S3 control the actuation of the ram III for the setting of the transmission to the third speed ratio. The valve S4 controls the actuation of the ram IV for the setting of the transmission to the fourth speed ratio.

Moreover, the valve housing includes a pressure controller T which controls the pressure fluid supplied from the pump P1 or P2 to the gear shift valves S2, S3 and S4 in the manner disclosed in my co-pending application Serial No. 320,032. Finally, the valve casing includes valves Av and V to be described later.

Each of the pilot valves K2 and K3 and the combined pilot and gear shift valve S4 constitutes a differential piston formed by a piston section of smaller diameter and a piston section of larger diameter. Thus, the pilot valve K2 comprises the piston sections 75 and 76 connected in spaced relationship by a valve stem. Pilot valve K3 comprises the spaced piston sections 77 and 78. The combined pilot and gear shift valve S4 comprises the spaced piston sections 79 and 80. Each of the valves K2 and K3 is urged towards its right hand end position by a spring 81, or 82 respectively, accommodated within the cylinder bore 83 or 84 respectively, in which the pilot valve piston section of smaller diameter is guided. The end of the cylinder bore 83 is connected by a pipe 85 with the pressure pipes 14 and 71 of pump P, the pressure therein being controlled by the pressure step controller R. The cylinder bore 84 accommodating section 77 of smaller diameter of pilot valve K3 is connected by line 73 to groove 69 controlled by conditioning valve Q. The cylinder bore 86 accommodating piston section 79 of the valve S4 communicates by a pipe 74 with the groove 70 controlled by valve Q. The valve S4 is urged towards the left end position shown in Fig. 5 by a spring 87 inserted in the cylinder bore 128 of larger diameter.

The spring 81 is biassed to a higher degree than spring 82. Therefore, valve K3 is urged towards the right with a smaller force than is valve member K2. In Fig. 5 valves K3 and S4 are illustrated in their left end positions, whereas valve K2 assumes its right end position.

The pressure controller T comprises a stem 94 equipped with spaced piston sections 88, 89, 90, 91, and 92 and is urged by a spring 93 towards the left, such spring being inserted between an internal shoulder of the bore accommodating the valve and a washer adjacent to piston section 92.

The stem 94 of valve T when moving from the position shown in Fig. 5 towards the right, abuts against a diaphragm 95 within a housing 96 constituting a vacuum-controlled actuator M. The interior of the housing 96 is divided by the diaphragm into two compartments, the one on the left communicating with the atmosphere and the one on the right communicating with a pipe 97 leading to the intake manifold of a throttle-controlled internal combustion engine. Moreover, the housing 96 is provided with a sleeve 186 in which a rod 99 is slidably guided, such rod carrying a thimble 187 on its inner end, its outer end being connected by suitable motion-transmitting elements, such as a link 188, to the accelerator pedal 100 of the motor vehicle. A helical pressure spring 98 is inserted between the diaphragm 95 and the thimble 187 and will be tensioned by depression of the accelerator pedal 100 beyond the position shown in Fig. 5 which is the full load position in which the throttle is fully open.

Each of the piston sections 89, 90, 91 and 92 is adapted to control the communication of lines 129, 130, 131 and 132 with supply lines 112 and 123 in such a manner that continuous movement of valve member T to the left will successively cut off lines 132, 131, 130 and 129 in the manner described in my co-pending application Serial No. 320,032.

The slide valve Av controls the connection of a pipe 101 leading to the primary pump P1 geared to the ingoing shaft of the transmission with a pipe 102 to the cut off valve V. The latter is connected by a pipe 103 with the secondary pump P2 which is geared to the outgoing shaft of the transmission and which may be mounted on the same shaft as the pump P. The valve V is composed of a cylindrical chamber encasing two balls 104 and 105 urged apart by an interposed helical spring 106, the end faces of the chamber being provided with valve seats connected to the lines 102 and 103. Moreover, the chamber has a port between its ends connected to a line 107 leading via a filter 108 and a line 109 to an internal groove 110 controlled by slide valve 63. When the valve is in the position shown, the groove 110 communicates with a port connected to a line 111. The latter has branches 112 and 113. Branch 112 leads to the internal grooves 114 and 115 of the bore accommodating pressure controller T. The branch line 113 is connected to further branch lines 116 and 117. Line 116 communicates with a groove 118 adapted to be controlled by piston section 76 of pilot valve K2. Pipe 117 leads to a control groove 119 adapted to be controlled by piston section 78 of valve K3. Moreover, branch line 120 connects line 109 with the pressure controller T, a branch 121 leading to the end space 122 of the cylindrical bore thereof, whereas a branch line 123 leads to an internal groove 124. Communication of the latter with line 132 is controlled by piston section 92 of valve T. A branch line 125 leads from line 120 and branches 189 and 190 to the end spaces 126, 127 and 128 of the valve chambers of valves K2, K3 and S4.

The outgoing line 129 controlled by the pressure controller T has a branch 133 leading to an internal groove 134 of the valve housing controlled by cylinder section 80 of valve S4. Another branch line 135 leads to the ram I adapted to actuate the toothed clutch rendering the first gear effective. If ram I is actuated while each of the rams II, III and IV is de-energized being put on exhaust, the transmission is set to the first speed ratio. The pipe 130 controlled by the pressure controller T leads to an internal groove 152 of the bore accommodating valve member S2. The pipe 131 controlled by the pressure controller T leads to an internal groove 155 of the bore accommodating valve member S3. Line 132 likewise controlled by pressure controller T communicates through a line 191 with the lubricating point or points marked by the circle denoted at Sch, and by line 136 with the hydrodynamic clutch marked by the circle denoted at Hy. Moreover, line 136 is connected by a branch 192 to the end space 137 of a cylindrical bore accommodating valve member Av which comprises two cylindrical sections 138 and 139 connected in spaced relationship by a valve stem and accommodating a helical spring 140 tending to urge the valve member of valve A*v* to the position shown. When the pressure in the end space 137 overcomes that of spring 140, the valve member A*v* is moved to the left until its cylindrical section 139 uncovers a groove 141 connected to the exhaust O whereby the surplus oil fed through line 136 will be discharged against the pressure maintained by spring 140. Just before that happens, however, piston section 138 has uncovered an internal groove 142 likewise put on exhaust O thus establishing a communication therewith of pump P1, whereby the pump P1 is rendered inactive permitting valve ball 104 to be pressed on its seat.

The gear shift valve S2 comprises two valve members slidably guided in a cylindrical bore of the valve casing, one of said valve members being formed by two cylindrical sections 144 and 145 connected in spaced relationship by a valve stem 143, and the other valve member comprising a cup-shaped valve member 146 having an external groove 169 communicating with the inner space 170 by radial bores and, in its turn, accommodating a helical pressure spring 147 tending to move valve member 146 to the left into engagement with a stem 193 integral with the other valve members 143, 144, 145. A helical spring 148 surrounds stem 193 and tends to urge the two valve members apart. The two valve members control a plurality of ports which will be described later with reference to the operation of the control system.

The gear shift valve S3 comprises a valve member slidably guided in a cylindrical bore of the valve casing and formed by two piston sections 149 and 150 connected in spaced relationship by a stem and adapted to control the alternative communication of an internal groove 156 with one or the other of two internal grooves 155 and 163. A spring 151 inserted in the end space 167 of the internal bore tends to keep the valve member in its left end position shown in Fig. 5, while the two grooves 156 and 163 are put into mutual communication.

The line 130 controlled by the pressure controller T leads to an internal groove 152 of gear shift valve S2. When the latter is in the position shown, such groove communicates with a groove 153 which is connected with a line 154 leading to the ram II which if actuated by fluid pressure sets the transmission to the second speed ratio.

The line 131 controlled by the pressure controller T is connected to the internal groove 155 of valve S3, whereas the groove 156 of the latter is connected by a line 157 with the ram III which when fed by fluid under pressure will set the transmission to the third speed ratio.

The pilot and gear shift valve S4 controls the alternative communication of a port 158 connected by line 159 to ram IV either with an internal groove 185 connected to exhaust O, as shown in Fig. 5, or with the internal groove 134 which, as stated heretofore, is supplied with fluid under pressure controlled by pressure controller T via lines 129 and 133. The ram IV when actuated by fluid under pressure will set the transmission to its fourth speed ratio.

The valve member 63 coordinated with the conditioning valve Q controls a port 184 communicating with a line 160. In the position shown, valve 63 establishes a communication thereof with an internal groove 161 put on exhaust O. When the valve 63 is depressed by valve Q coincidentally to the setting of lever 16 to "synchronizing," port 184 will be put in communication with the internal groove 110 connected to line 109 as described and as shown in Figure 13. Pipe line 160 has two branches, one leading to the internal groove 163 controlled by gear shift valve S3 and the other one leading to an internal groove 162 controlled by gear shift valve S2.

Suitable means are provided which ensure that coincidentally to the actuation of ram III, ram II will be put on exhaust. To this end, the internal groove 156 controlled by valve S3 is connected by a duct 164 with the space 165 of the bore accommodating valve S2. Similarly, means are provided to ensure inactivation of ram III upon actuation of ram IV. For that purpose, line 159 supplying ram IV has a branch line 166 leading to the end space 167 of the bore accommodating valve S3, a branch line 168 connecting line 166 with a port communicating with the external groove 169 of valve member 146 of valve S2. Fluid pressure supplied to ram IV will thus obtain access through lines 166 and 168, groove 169 and radial bores to the interior space 147 of cup-shaped valve member 146 shifting the same to the left.

From a port communicating with the space 172 between piston sections 75 and 76 of pilot valve K2, a duct 171 leads to the end space 173 of the bore accommodating gear shift valve S2. Similarly, a port communicating with the space 175 between piston sections 77 and 78 of pilot valve K3 is connected by a duct 174 with an internal groove 176 of the bore accommodating valve S2, said groove 176 being spaced from the port of line 168 a distance less than the width of the external groove 169. A branch duct 177 leads from line 174 to the left end space 178 of the bore accommodating valve S3.

The operation of the novel control system is as follows:

Let us assume that the control lever (not shown) mounted on the steering column and cooperatively connected with lever 16 is set to its "idling" position indicated at *a* in Fig. 4 thereby conditioning valve Q to the position illustrated in Fig. 10. Let us further assume that the engine has been started. Piston section 60 of conditioning valve section Q2 is positioned beneath internal groove 68 putting lines 14, 71 and 72 in communication with exhaust and reducing the pressure in lines 14, 71 and 72 to atmospheric pressure. Super-pressure valve U remains in its lowermost position shown in Fig. 5. Pilot valve K2 likewise assumes the position shown in Fig. 5, the same being the right hand end position. Pilot and gear shift valve S4 is kept by spring 87 in its left end position as shown, because line 74 communicating with the end space 86 of valve S4 is put on exhaust via the internal groove 161, the piston section 61 of conditioning valve section Q2 being depressed to a position beneath the upper edge of groove 161. For the same reason line 73 is put on exhaust.

When the engine is idling, the pump P1 driven by the engine produces pressure communicated via 101, 102, V, 107, 108, 120, 125, 189 and 190 to the end spaces 126 and 127 of the pilot valves K2 and K3, whereby the valve members of the same will be urged to the left contrary to the tendency of their springs 83 and 84.

The pilot valves of the control system are now conditioned to cause actuation of ram II to set the transmission to the second speed ratio. The valve 63, which as stated has been depressed by the conditioning valve Q, puts line 111 leading to a port located between piston sections 66 and 65 in communication with a peripheral groove connected to a line 180 leading to exhaust. Since pilot valve K2 establishes communication between groove 118 connected to line 116 and a port connected to line 171, the following connection is established: Line 180 connected to the atmosphere, line 111, line 116, groove 118, space 172, line 171, and end space 173 of valve S2. Therefore, spring 148 will move the valve section including pistons 144 and 145 to the left. Pilot valve K3 establishes the following communication: Groove 181 connected to exhaust, space 175, line 174, and end space 177 of gear shift valve S3. Therefore, spring 151 will keep valve S3 in the resting position shown in Fig. 5. As a result, the rams II, III and IV are connected to exhaust, lines 129, 130 and 131 being connected to exhaust via 111, 112, 114, and 115. The ram I of the first gear is likewise on exhaust via line 135, line 129, peripheral groove 114 of pressure controller T, line 112, line 111, and line 180.

When the driver wishes to start the vehicle, he must shift the control lever (not shown) mounted on the steering column to the position "normal" shown in Fig. 4 thereby moving lever 16 to the position "normal" shown in Fig. 5 bringing the conditioning valve Q to the position shown in Fig. 5. Fluid fed by the primary pump P1 is fed via lines 101 and 102 to the valve V lifting ball 104 from its seat while keeping ball 105 on its seat as long as the vehicle is driving at so slow a speed that the pressure produced by the secondary pump P2 is insufficient to overcome the pressure of spring 106. From valve V the pressure fluid is fed through line 107, filter 108, line 109, groove 110, and lines 111 and 112 to the pressure controller T whence the pressure oil is admitted to the lines 129 to 132. Moreover, the pressure oil is admitted from line 111 through lines 113 and 116, groove 118 and port 172 of the pilot valve K2 and through duct 171 to the pressure space 173 of the gear shift valve S2, whereby valve S2 is shifted to the position shown in Fig. 5. As a result, the gear shift valve S2 admits pressure fluid from line 130 via grooves 152 and 153 and line 154 to ram II setting the transmission to the second speed ratio. As soon as the vehicle attains a certain speed causing pump P2 to produce sufficient pressure to lift valve ball 105 from its seat, the control system will now be supplied with pressure fluid from the secondary pump. When the pressure oil is fed from filter 108 via lines 120 and 123 to groove 124 and thence past piston section 92 to lines 132, 136 and 192, the pressure therein will shift valve Av in the manner described thereby putting lines 101 and 102 on exhaust and permitting spring 106 to press ball 104 on its seat.

While the lines 112 and 113 connected to line 111 and the ducts and valve spaces communicating therewith are controlled by the conditioning valve Q and by the valve 63, the lines 120, 123 and 125 communicating with the filter 108 are independent of the conditioning valve Q. The pressure controller T is subjected to the pressure in the associated end space 122 connected to lines 121 and 120 which are thus independent of the setting of lever 16. Similarly, the supply of oil under pressure to the hydrodynamic clutch line 136 and the supply of lubricating oil through line 191 are independent of the setting of lever 16.

The valve Av acts as an over-pressure valve limiting the maximum pressure. When the pressure in space 137 rises beyond a certain level, the primary pump P1 is first put on exhaust via groove 142, whereupon the space 137 is connected with the exhaust via groove 141 should the pressure in line 136 and space 137 overcome spring 140. Moreover, the valve Av is operative as described to disable pump P1 as soon as pump P2 is able to supply the required fluid under pressure.

The pilot valves are subject to the pressure controlled by the pressure step controller R and are thereby enabled to respond to an increase of the vehicle speed beyond the speed limits V1, V2 and V3 as described hereinabove.

The pressure controller T, which as stated above is acted upon by the pressure in space 122, is subject to the pressure of spring 93 and to an additional pressure exerted by the diaphragm 95. The pressure exerted by the diaphragm depends on the vacuum in the intake manifold of the engine communicating through pipe 97 with the diaphragm chamber, and on the bias of spring 98 produced when the accelerator pedal 100 is kicked down beyond its full gas position in which the throttle is fully opened. The dependence on the vacuum of the machine has the effect that piston section 92 will throttle the flow of fluid from pipe 123 to pipe 132 more or less thus maintaining in lines 123, 120, 125, 189 and 190 a pressure substantially corresponding to the torque produced by the engine as the vacuum in the intake of the engine is proportional to the torque produced by the engine. In this manner, the pilot valves K2, K3 and S4 are controlled in dependence on the torque produced by the engine thus being able to determine the shifting-up diagram of the control system and, at the same time, the pressure produced in the friction clutches of the transmission by the rams.

A continuous displacement of the valve member of pressure controller T to the right will successively open lines 130, 131, 129 and 132, line 130 supplying ram II, line 131 supplying ram III, line 129 supplying rams I and IV, and line 132 supplying oil for the lubrication points Sch and for the hydrodynamic clutch Hy. For a detailed explanation of the function of the pressure controller reference may be had to my co-pending application Serial No. 320,032.

The maximum pressure supplied to the rams is controlled by valve Av as described hereinabove.

The pressure spaces 126, 127 and 128 of the pilot valves K2, K3 and S4 are supplied by the primary pump P1 or the secondary pump P2 directly via lines 120, 125, 189 and 190. Therefore, the function of the pilot valves is independent of the setting of the conditioning valve Q. The pressure spaces 83, 84 and 86 of the pilot valves are supplied with fluid under pressure controlled by the pressure step controller R, such pressure thus depending on the speed of the vehicle.

The springs 81, 82 and 87 of the pilot valves are so dimensioned and biassed as mentioned hereinabove that when the fluid pressure amounts to $p1$ (Fig. 7) it holds pilot valve K2 in its operated right hand position shown in Fig. 5 thereby causing fluid pressure to be supplied to ram II in the manner to be described hereinafter, irrespective of the pressure maintained by pressure controller T in space 126 as long as accelerator pedal 100 is not kicked down. The pilot valve K2 in its operated position establishes a communication from valve V via line 107, filter 108, line 109, groove 110, line 111, line 113, line 116, groove 118 controlled by pilot valve K2, space 172 of the latter, line 171, and end space 173 whereby gear shift valve S2 is urged to the position shown in Fig. 5. This valve establishes a communication from line 111 via line 112, groove 114, groove 182, duct 130, groove 152 of gear shift valve S2, groove 153 of the latter, and line 154 to ram II.

When the speed of the vehicle increases beyond speed V1, the pressure step controller R raises the pressure in line 71 to $p2$ (Fig. 7) in the manner described. As a result, pilot valve K2 will be maintained in the position shown in Fig. 5, even should pressure in space 126 be increased by the driver kicking down accelerator pedal 100.

Should the pressure maintained in lines 125 and 190 and in space 127 of pilot valve K3 by the pressure controller T in dependence on the intake vacuum drop below a value corresponding to the curve D—E in Fig. 1, or should the speed of the vehicle exceed the limit V2, the pilot valve K3 will be shifted to the right under the combined effect of spring 82 and of the fluid pressure set up by pressure step controller R in lines 71 and 73 and in space 84. However, by kicking down the accelerator pedal 100 beyond its full power position, the driver may increase the throttling effect of piston section 92 and may thereby raise the pressure prevailing in lines 123, 125 and 189 and in space 126 to such an extent as to cause displacement of pilot valve K2 to the left, provided that the vehicle speed does not exceed the limit V1. Movement of pilot valve K2 to the left causes the relief of ram II from pressure in the manner described hereininafter, whereby the transmission will be operated at the first speed ratio, since ram I is being supplied with fluid under pressure via lines 129 and 135, and since the gear clutched to the driving shaft by the toothed clutch actuated by ram I acts on the outgoing shaft of the transmission via a one-way clutch. Movement of pilot valve K2 to the left causes end space 173 of gear shift valve S2 to be put on exhaust via 171, 172, and a groove 183 connected to exhaust O. As a result, piston sections 144 and 144 of gear shift valve S2 are moved by spring 148 to the left putting ram II on exhaust via line 154, groove 153, groove 162, line 160, groove 184, groove 161, O.

The following operations occur when the transmission is shifted from the second speed ratio to the third speed ratio: Shifting of the pilot valve K2 to its right hand end position shown in Fig. 5 establishes communication of the primary or secondary pump via 111, 113, 116, 118, and 172 with the line 171, whereby pressure is supplied to the end space 173 shifting gear shift valve S2 to the position shown in Fig. 5. The space 165 of gear shift valve S2 is put on exhaust via line 164, groove 156 of gear shift valve S3, groove 163 of the same, line 160, groove 184, and groove 161. End space 170 of gear shift valve S2 is likewise put on exhaust via groove 169, lines 168, 166 and 159, port 158 of valve S4, and groove 185 of the latter which is connected to exhaust O. Therefore, valve S2 is kept in its right hand position shown permitting pressure oil to be supplied from line 112 via groove 114 of pressure controller T, line 130, grooves 152 and 153, and line 154 to ram II.

As stated heretofore, an increase of the speed of the vehicle beyond the limit V1 causes the ball 47 of the pressure step controller R to increase the pressure to $p2$. If at that time the transmission had already been shifted to the second speed ratio, and if the power output of the transmission exceeds N3 (Fig. 1), the pilot valve K2 assuming its right hand end position, the increase of the fluid pressure to $p2$ has the sole effect that the driver can no longer shift the transmission back to the first speed ratio by kicking down the accelerator pedal thereby increasing the pressure in space 126 beyond the normal maximum pressure.

At the same time, however, the pilot valve K3 is put in condition for operation being ready to move to the right as soon as the vacuum-controlled pressure in the end space 127 drops below a certain limit. In that instant, the pilot valve K3 is shifted to the right whereby the pressure fluid having a pressure controlled by the pressure controller T is admitted via the pipes 111, 113 and 117, groove 119, space 175, line 174, and line 177 to the pressure space 178 of the gear shift valve S3 thereby shifting the same to the right. As a result, the fluid under pressure controlled by the pressure controller T will be admitted via line 131, groove 155, groove 156, and line 157 to the ram III thus setting the transmission to the third speed ratio. From groove 156 pressure fluid is admitted through line 164 into the space 165 of valve S2 thereby shifting the valve member provided with piston sections 144 and 145 to the left. That has the effect of putting ram II on exhaust in a manner described heretofore.

When pipe 131 is opened by piston section 91 of the pressure controller T, the sudden admission of fluid under pressure to ram III causes a drop of pressure in end space 122 tending to move the pressure controller T to the left whereby the admission to line 131 is throttled to such an extent as to maintain in lines 121 and 120 the pressure determined by the intake vacuum of the engine. Line 130, however, is kept open, whereas line 129 supplying ram I and ram IV is temporarily closed by piston section 89. As described in my co-pending application, that has the effect of delaying the supply of fluid under pressure to ram I until after ram II has been supplied with pressure fluid. That in turn has the effect of synchronizing the toothed clutch elements actuated by ram I.

Maintenance of the pressure by the pressure controller T keeps the transmission set to the second speed ratio until a certain minimum pressure has been built up in ram III. Only after such minimum pressure has been reached and has been transferred via groove 156 and line 164 to space 165 of gear shift valve S2 will ram III be actuated and gear shift valve S2 restored to the left to thereby relieve ram II from pressure. The timed overlapping of the actuation of rams II and III ensures that the transfer of power through the transmission will not be interrupted.

It has been assumed hereinabove that the transmission is shifted to the third speed ratio by a drop of the power output below curve N3 in Fig. 1. However, the same shifting operation of the transmission occurs when the speed of the vehicle exceeds the limit V2 at a time when the power output is above the values defined by the line N3. In that event, the pressure prevailing in space 84 of pilot valve K3 will be increased by the pressure step controller R to the amount $p3$ overcoming the pressure prevailing in space 127 thereby shifting the pilot valve K3 to the right causing gear shift valve S3 to be likewise shifted to the right, whereby pressure oil will be supplied to ram III in the manner described.

When the vehicle speed exceeds V3, the pressure prevailing in space 86 of pilot valve S4 is increased to the value $p4$ (Fig. 7), whereby the pilot valve S4 is shifted to the right. As a result, fluid under pressure controlled by the pressure controller T is admitted from line 129 via line 133, groove 134, port 158, and line 159 to ram IV setting the transmission to the fourth speed ratio. The same shifting operation may occur while the speed of the vehicle is between the limits V2 and V3 provided that the intake vacuum of the engine reduces the pressure prevailing in the end space 128 of valve S4 to an amount corresponding to a power output lower than the curve H—I.

Coincidentally to the actuation of ram IV fluid under pressure is supplied from line 159 via line 166 to pressure space 167 of valve S3 and through branch pipe 168 and groove 169 to pressure space 170 of valve S2. This has the effect of locking valve S2 in its left end position, as described in detail in my co-pending patent application Serial No. 320,032. Moreover, it has the effect of restoring valve S3 to the position shown as soon as sufficient pressure has been built up in ram IV to cause actuation thereof. Such pressure will shift gear shift valve S3 to the position shown contrary to the tendency of the pressure prevailing in space 178.

When the speed of the vehicle drops, the flyweights 47, 48, 49 and 50 will be successively restored to their resting position thereby stepwise reducing the pressure. However, such reduction will not occur when the speed passes through the limits V3, V2 and V1, but it will occur when the speed passes through slightly lower limits V3', V2' and V1'.

That is so because the balls, after having sealed the outlets 51, 52, 53 and 54, are not only subject to the centrifugal force but are subject to the additional unbalanced fluid pressure prevailing in the chambers 43, 44, 45, and 46. Therefore, when the speed of the vehicle drops, the springs 56, 57, 58 and 59 must overcome not only the centrifugal force but the additional unbalanced fluid pressure. They are not able to do so until the speed passes through the lower limits V3', V2' and V1'.

When the speed of the vehicle drops, the shifting-down operation will not occur until the speed passes through the speed limit. If the transmission has been set to its fourth speed ratio for instance, it will not be set to the third speed ratio automatically as long as the speed exceeds V2', irrespective of the power output of the engine and of the intake-vacuum controlled pressure prevailing in space 87. Therefore, the condition of operation of the vehicle with the transmission set to any particular ratio, for instance to the fourth speed ratio, may be determined in Fig. 1 by a point located above line N4, provided that such point is reached after the vehicle was operated previously under a condition represented by a point located within area G—H—I—L—M. This effect is attained by the function of the pilot valves as differential pistons. Once a pilot valve, such as valve S4, has been shifted to its operative right hand position, the pressure prevailing in the end space 87 is counteracted by the pressure prevailing between the two piston sections 79 and 80 and acting on the effective differential area of the two cross sections of 79 and 80. When the driver releases the accelerator pedal 100 closing the engine throttle more or less thus increasing the vacuum acting on diaphragm 95, the piston section 92 will reduce the pressure prevailing in lines 123, 120 and 125 and in end space 127 of valve K3. Nevertheless valve K3 will be maintained in the position shown. Also, a drop of the pressure prevailing in space 86 of pilot valve S4 to the amount p3 will not cause a restoration of the pilot valve S4 because the spring 87 is counteracted by the differential pressure between piston sections 79 and 80. In that respect, the function differs from that occurring in the shifting-up operation in which the pilot valve S4 remains in its left end position keeping the transmission shifted to the third speed ratio as the pressure step controller R maintains the pressure on the limit p3. Of course, the driver if he wishes may nevertheless shift the transmission from the fourth speed ratio to the third speed ratio while the vehicle speed is between the limits V2 and V3, or V2' and V3' respectively, by kicking down the accelerator pedal all the way, whereby spring 98 is given an additional bias increasing the throttling effect of piston section 92 and raising the pressure prevailing in lines 123 and 125 and in the end space 128 beyond the normal amount thus enforcing a restoration of pilot valve S4 in a manner similar to that described with reference to the shifting of the transmission from the second speed ratio to the first speed ratio. Similar considerations apply to the shifting from the third speed ratio to the second speed ratio.

Now the operation of the novel control system will be described when conditioned for the operation "braking I", as may be desirable for driving in city traffic. With that adjustment, the groove 70 of the conditioning valve Q is disconnected from pressure pipe 72 and pump P and is put on exhaust via a discharge port 194. Therefore, the end space 86 of the pilot and gear shift valve S4 connected to the groove 70 by duct 74 can no longer be subjected to fluid pressure, and the valve S4 can no longer be moved to operated position but will keep ram IV de-energized.

Groove 20 controlled by the super-pressure valve U is now put by conditioning valve section Q1 into communication with the duct 32 and thus via groove 37 and longitudinal duct 41 with the chamber 45 of the pressure step controller, whereas in the normal condition of valve Q2 the groove 20 was in communication with chamber 44. The spring 58 coordinated to chamber 45 is so biassed, however, that the ball 49 seals the associated outlet 53 at a speed V2x which is higher than the speed V2. Therefore, with the control system conditioned for "braking I," the pressure step controller will not raise the fluid pressure in lines 14 and 71 to the amount p3 until the higher speed limit V2x has been reached as illustrated in Fig. 8.

Hence, the transmission will be kept set to the second speed ratio up to a higher speed of the vehicle as is desirable for city traffic. Otherwise the function is the same as described for "normal."

When the control system is conditioned for "braking II" by suitable adjustment of lever 16 and conditioning valve Q, the groove 69 will be put on exhause via groove 194 and thereby the end space 84 of the pilot valve K3 will be relieved from pressure via duct 73 and the groove 69. As a result, the two rams III and IV will not be energized and the transmission can be set to either the first speed ratio or the second speed ratio only, as shown in Fig. 3.

The valve section Q1 establishes a communication between port 19 and port 31 in the pressure step controller R. As a result, the pressure prevailing in lines 14 and 71 will not be raised from p1 to p2 until the speed of the vehicle exceeds the limit V2 causing ball 48 to close the outlet 52. While the pressure may be raised beyond p2 by the pressure step controlled when higher speeds are attained, such increase of the pressure will not have any effect because the pilot valves K3 and S4 have been inactivated in the manner described. When the driver shifts his control lever mounted on the steering column into "Reverse" or into "Parking," lever 16 by its connection with such control lever is temporarily rocked into the position "Reverse" (which is indicated in Fig. 5 as the highest position) whereby the stem of valve Q is depressed to its lowermost position and acting on valve 63 moves the latter down until it establishes a commuication between line 160 and groove 110. This has the effect of a simultaneous actuation of rams II and III whereby the driven member of the hydrodynamic clutch and the transmission elements geared thereto are brought to a full stop preparatory to the shifting of the reversing gear into mesh or preparatory to the engagement of the parking locking member. Such simultaneous actuation of rams II and III is effected by the establishment of a connection of line 107 via filter 108, line 109, groove 110, space between piston sections 65 and 64, line 160, grooves 162, 163 and thence, since the valves S2 and S3 are in their left end positions, to the rams II and III. When lever 16 returns to "Idling", piston section 65 closes groove 110 again and the uppermost piston section 66 of valve 63 uncovers the groove connected to exhaust O, thereby relieving line 160 from pressure and de-energizing rams II and III causing disengagement of the friction clutches actuated by such rams.

Hereinafter the conditions will be recapitulated which result in the described actuation of the pilot valves.

$p1$, $p2$, $p3$ and $p4$ define the fluid pressures as shown in Figs. 7, 8 and 9.

$f1$, $f2$, $f3$ define the pressures exerted by springs 81, 82 and 87.

$pu1$, $pu2$, $pu3$ define the pressures which, if applied to the end spaces 126, 127, 128 of the pilot valves, will produce the shifting operation prescribed by the boundary lines, such pressures depending on the driving torque.

$p$-Min defines the smallest controlled pressure (basic pressure).

$p$-Max defines the largest controlled pressure with fully opened throttle of the engine.

$pu$ defines the super-pressure produced in spaces 126, 127, 128 by kicking down the accelerator pedal.

$k$ defines the smaller cross sectional area of the piston sections 75, 77 and 79, and $k1$, $k2$, $k3$ define the cross sectional areas of the larger piston sections 76, 78 and 80.

The operation of the pilot valve K1 for the second speed ratio is controlled by the following conditions:

(1) $\qquad p1 \cdot k + f1 = pu1 \cdot k1$ as condition for the shifting operation under conditions defined by a curve N1, N2 or N3 in Figs. 1, 2 and 3;

(2) $\qquad p1 \cdot k + f1 > p\text{-max} \cdot k$ as the condition excluding an automatic shifting-down operation without a kick-down of the accelerator pedal;

(3) $\qquad p1 \cdot k + f1 < pu \cdot k$ as a condition ensuring the shifting-down operation produced by a kick-down of the accelerator pedal;

(4) $\qquad p2 \cdot k + f1 > pu \cdot k1$ as a condition ensuring that with the increased fluid pressure $pu1$, $pu2$ or $pu3$ even a kick-down will not produce a shifting-down operation from the third speed ratio to the second speed ratio, and that with such a kick-down there will be a shifting-up operation from the second to the third speed ration;

(5) $\qquad p\text{-min} \cdot k > f1 + p1 \cdot k$ as a condition preventing the actuation of the pilot valve of the next higher order as long as $p1$ is effective.

Similar conditions apply to the other pilot valves.

From the foregoing it will be readily understood that my novel control system comprises the following basic elements:

A first means, in the present embodiment in form of any one of the pilot valves K2, K3 and S4, adapted when actuated by fluid pressure to shift the transmission from the first to the second ratio, or from the second to the third ratio, or from the third to the fourth ratio respectively;

A second means, in the present embodiment in form of the valve T, influenced by diaphragm 95 substantially in proportion to the driving torque exerted upon the transmission by the engine of the motor vehicle. By controlling the pressure in lines 123, 125, 189 and 190 the valve T is adapted to cause actuation of said first means, i. e. of each of the pilot valves K2, K3 and S4;

A third means, in the present embodiment in form of the pressure step controller R, controlled by the speed of the vehicle and adapted by controlling the pressure of the fluid admitted to spaces 83, 84 and 86 to likewise cause actuation of said first means K2, K3 or S4; and Means, in the present embodiment formed by the valve 63, rendering said second means T operative between a lower limit and an upper limit of the vehicle speed, such as V2 and V3, to cause actuation of said first means, e. g. K3, in response to a change of the engine torque. Beyond the upper speed limit, such as V3, the third means, to wit the pressure step controller R, is operative to enforce actuation of said first means, such as K3, irrespective of the condition of T, i. e. irrespective of the torque produced by the engine. As a result, the transmission will be shifted from the third ratio to the fourth ratio or, broadly speaking, from a certain ratio to the next higher ratio, automatically between said speed limits V2 and V3 in dependence on the engine torque. But the transmission will be shifted at any rate when the vehicle speed exceeds said upper limit, such as V3, no matter what the engine torque at that time might be.

While I have described a preferred embodiment of my invention, I wish it to be clearly understood that the same is not limited to the details of such embodiment, but it is capable of numerous modifications within the scope of the appended claims.

What I claim is:

1. In a control system for a motor vehicle transmission, the combination comprising a source of pressure fluid, a relief valve member subjected to the fluid pressure of said source and adapted when moved by said pressure to successively uncover a plurality of relief ports, a plurality of discharge ports connected to respective relief ports, a spring acting on said valve member in opposition to said fluid pressure, and means responsive to the rate of travel of said vehicle and adapted as said rate increases to successively prevent flow of said fluid through said discharge ports to thereby increase said pressure step by step.

2. The combination claimed in claim 1 in which said means responsive to the rate of travel of the vehicle comprises a centrifugal governor having a plurality of flyweights, each flyweight controlling one of said discharge ports, and springs being individually coordinated to said flyweights and being differentially biassed thereby rendering said flyweights responsive to different speeds.

3. The combination claimed in claim 1 in which said means responsive to the rate of travel of the vehicle comprises a rotary member having eccentrically located valve chambers each provided with an external discharge opening, balls encased in said chambers and adapted under the effect of a centrifugal force to close said openings, said balls and said springs being so differentially proportioned as to be responsive to different rotary speeds.

4. A control system for a motor vehicle transmission adapted to be set to any one of a plurality of ratios of transmission, comprising first means operative upon actuation thereof to control the shifting of said transmission from one of said ratios to the next higher one of said ratios, second means operative by the intake manifold vacuum and proportional at least in part essentially in dependence on the driving torque exerted by the engine of the motor vehicle upon said transmission and adapted to cause actuation of said first means, third means controlled by the speed of the vehicle and adapted to likewise cause actuation of said first means, and means rendering said second means operative between a lower limit and an upper limit of said speed to cause actuation of said first means in response to a change of said vacuum and therewith of said torque, said third means being operative beyond said upper speed limit to enforce actuation of said first means irrespective of the condition of said second means, whereby the shifting of the transmission from said one ratio to the next higher ratio is automatically effected between said speed limits in dependence on said vacuum and therewith of said torque and the transmission is thus shifted to said next higher ratio when the vehicle speed exceeds said upper limit irrespective of said torque.

5. A control system as claimed in claim 4, wherein said first means is operative upon restoration to "normal" to control the shifting of said transmission back from said next higher one of said ratios to said first-mentioned one, said second means being unable to cause restoration of said first means while said third means is operative below said lower speed limit to enforce restoration of said first means irrespective of the condition of said second means, whereby the transmission will be shifted back from the higher speed ratio to the next lower speed ratio irrespective of the torque of the engine, when the speed drops below the lower one of said limits.

6. A control system as claimed in claim 4, wherein said first means is operative upon restoration to "normal" to control the shifting of said transmission back from said next higher one of said ratios to said first-mentioned one, said second means being unable to cause restoration of said first means while said third means is operative below said lower speed limit to enforce restoration of said first means irrespective of the condition of said second means, and further comprising fourth means arbitrarily operable by the driver to enforce upon actuation thereof restoration of said first means, whereby the transmission will be shifted back from the higher speed ratio to the next lower speed ratio, irrespective of the torque of the engine, either when the speed drops below the lower one of said limits or when the driver arbitrarily operates said fourth means.

7. The combination with a control system for a motor vehicle transmission adapted to be set to any one of a plurality of ratios of transmission of settable means settable by the driver and operative to condition said control system to any one of three ranges having a plurality of transmission ratios with at least two ratios defining each range, said system including means operative in one of said ranges to automatically shift said transmission to any one of said plurality of ratios, operative in a second one of said ranges to automatically shift said transmission to any one of a number of ratios smaller than said plurality, and operative in the third one of said ranges to automatically shift said transmission to any one of a number of ratios smaller than said last-mentioned number.

8. The combination as claimed in claim 7, wherein said control system comprises first means operative upon actuation thereof to control shifting of said transmission from one of said ratios to the next higher one of said ratios, second means operative by the intake manifold vacuum and proportional at least in part substantially in dependence on the driving torque exerted by the engine of the motor vehicle upon said transmission and adapted to cause actuation of said first means, third means controlled by the speed of the vehicle and adapted to likewise cause actuation of said first means, and means rendering said second means operative between a lower limit and an upper limit of said speed to cause actuation of said first means in response to a change of said vacuum and therewith of said torque, of said third means being operative beyond said upper speed limit to enforce actuation of said first means irrespective of the condition of said second means, and said settable means being operative to control said third means so as to raise said upper limit of said speed in said second range and in said third range as compared to said first range.

9. A control system for a motor vehicle transmission adapted to be set to any one of four ratios of transmission, comprising first means operative upon actuation thereof to control shifting of said transmission from one of said ratios to the next higher one of said ratios, second means operative by the intake manifold vacuum and proportional at least in part substantially in dependence on the driving torque exerted upon said transmission by the engine of the motor vehicle and adapted to cause actuation of said first means, third means controlled by the speed of the vehicle and adapted to likewise cause actuation of said first means, means rendering said second means operative between a lower limit, an intermediate limit and an upper limit of said speed to cause actuation of said first means in response to a change of said vacuum and therewith of said torque, said third means being operative whenever the speed exceeds one of said limits to enforce actuation of said first means, and settable means arbitrarily settable by the driver and operative to condition said control system to an abnormal condition to thereby disable said first means to control shifting of said transmission from the third ratio to the fourth ratio, said settable means being further operative to control said third means to raise said intermediate speed limit.

10. Control system for a motor vehicle transmission adapted to be set to any one of four ratios of transmission, comprising first means operative upon actuation thereof to control shifting of said transmission from one of said ratios to the next higher one of said ratios, second means operative by the intake manifold vacuum and proportional at least in part substantially in dependence on the driving torque exerted upon said transmission by the engine of the motor vehicle and adapted to cause actuation of said first means, third means controlled by the speed of the vehicle and adapted to likewise cause actuation of said first means, means rendering said second means operative between a lower limit, an intermediate limit and an upper limit of said speed to cause actuation of said first means in response to a change of said vacuum and therewith of said torque, said third means being operative whenever the speed exceeds one of said limits to enforce actuation of said first means, and settable means arbitrarily settable by the driver and operative to condition said control system to a first abnormal condition, said settable means being also operatively connected with said first means to disable said first means in said first abnormal condition to control shifting of said transmission from said third ratio to said fourth ratio and being operatively connected with said third means to be operative in said first abnormal condition to control said third means so as to raise said intermediate speed limit, said settable means being further arbitrarily settable by the driver to condition said control system to a second abnormal condition, said settable means being also operatively connected with said first means to disable said first means in said second abnormal condition to control shifting of said transmission from said second ratio to said third ratio and from said third ratio to said fourth ratio and being further operatively connected with said third means to control said third means so as to raise said lower speed limit in said second abnormal condition.

11. A control system as claimed in claim 4, wherein said first means is operatively connected with said second means and said third means to make available within any range of speeds two ratios of transmission only, the upper speed limit of the range for the first transmission ratio substantially coinciding with the lower speed limit of the range for the third transmission ratio, and the upper speed limit of the range for the second transmission ratio substantially coinciding with the lower limit of the range for the fourth transmission ratio.

12. A control system as claimed in claim 4, wherein said first means is operative upon restoration to "normal" to control shifting of said transmission back from said next higher one of said ratios to said first mentioned one, said second means being unable to cause restoration of said first means, whereas said third means is operative when said speed drops below a limit slightly lower than said lower speed limit to enforce restoration of said first means irrespective of the condition of said second means, whereby the transmission will be shifted back from the higher speed ratio to the next lower speed ratio, irrespective of the torque of the engine, when the speed drops below the lower one of said limits.

13. A control system as claimed in claim 4, wherein said second means is operative to cause actuation of said first means between said speed limits in response to an increase in vacuum and therewith to a reduction of said torque, provided the engine is able to produce the same power output at the next higher speed ratio.

14. A control system for a motor vehicle transmission adapted to be set to any one of a plurality of ratios of transmission, comprising a set of valves operable by fluid pressure, each operative upon actuation thereof to cause said transmission to be shifted from one of said ratios to the next higher one of said ratios, conduits supplying actuating fluid to said valves, a source of pressure fluid, a pressure controlled operative to connect said source to said conduits and to control the pressure therein, means operative by the intake manifold vacuum and proportional at least in part substantially in dependence on the driving torque exerted upon said transmission by the engine of the motor vehicle to adjust said pressure controller thereby causing the latter in response to a decrease of said vacuum and therewith to an increase of said torque to vary the pressure in said conduits in a manner causing actuation of one of said valves, and a pressure step controller geared to the outgoing shaft of the transmission and operative to adjust said fluid pressure to any one of a plurality of rates depending on the speed of the vehicle, and ducts connecting said pressure step controller to said valves thereby causing at least one of the said valves to be shifted, irrespective of the condition of said pressure controller, whenever the speed of the vehicle exceeds certain limits.

15. A control system for a motor vehicle transmission of the type settable to any one of a plurality of ratios of transmission by the individual actuation of one of a plurality of fluid-operable rams, as claimed in claim 14, in which the ram for the lowest speed ratio is supplied with fluid under pressure by a fluid line controlled by said pressure controller and adapted to supply fluid under pressure to the ram of a higher speed ratio under the control of one of said valves, said fluid line bypassing said one of said valves.

16. A control system for a motor vehicle transmission of the type settable to any one of a plurality of ratios of transmission by the individual actuation of one of a plurality of fluid-operable rams, as claimed in claim 14, further comprising a manually settable valve operative when set for "idling" to relieve said rams and said ducts from pressure without affecting the pressure, which prevails in said conduits and is controlled by said pressure controller and acts on said valves.

17. The combination as claimed in claim 14 in which said source of pressure fluid comprises a pair of pumps arranged in shunt, one pump being geared to the ingoing shaft of the transmission and the other pump being geared to the outgoing shaft of the transmission, each pump being provided with an outlet controlled by a check valve.

18. A control system as claimed in claim 14, wherein in which said source of pressure fluid comprises a primary pump, a secondary pump, both pumps arranged in shunt, check valves coordinated to the outlets of said pumps, and a relief valve coordinated to said primary pump and operable by pressure produced by said secondary pump whereby pressure produced by said secondary pump will disable said primary pump.

19. A control system as claimed in claim 14, further comprising a manually operable conditioning valve operative to selectively connect said pressure step controller to said valves and to be set to at least one abnormal condition in which at least one of said valves is disconnected from said pressure step controller.

20. A control system as claimed in claim 4, wherein said third means comprises a source of pressure fluid, a spring-controlled relief valve movable by the pressure of said fluid and operative to control a plurality of discharge ports, and a rotary valve mechanism geared to the driven shaft of the transmission and operative to control said ports in dependence on the speed of the vehicle.

21. A control system as claimed in claim 14, wherein each of said valves is a pilot valve mounted to be movable by the opposed fluid pressures supplied through said conduits and through said ducts.

22. A control system as claimed in claim 14, wherein each of said valves is a pilot valve mounted to be movable by the opposed fluid pressures supplied through one of said conduits and through one of said ducts, said control system further comprising a plurality of fluid-operable rams, each ram being operative upon individual actuation thereof to set the transmission to a correlated transmission ratio, the ram of the highest ratio being controlled by one of said pilot valves, and gear shift valves individually connected to and operative to control the rams of the ratios other than the highest ratio and controlled by the other ones of said pilot valves.

23. A control system as claimed in claim 14, further comprising a plurality of fluid-operable rams, each ram being operative upon individual actuation thereof to set the transmission to a correlated transmission ratio, the ram of the highest ratio being controlled by one of said pilot valves, gear shift valves individually connected to and operative to control the rams of the ratios other than the highest ratio and controlled by the other ones of said pilot valves, and fluid lines controlled by said one of said pilot valves and by said gear shift valves connecting said rams to said pressure controller, whereby the pressure supplied to the rams depends at least in part on the vacuum and therewith of driving torque exerted upon the transmission by the engine of the motor vehicle.

24. A control system as claimed in claim 14 further comprising an accelerator pedal controlling the engine of the motor vehicle and means operable by said accelerator pedal to act on said pressure controller to increase the pressure in said conduits for arbitrarily actuating said valves.

25. A control system as claimed in claim 14 comprising a plurality of fluid-operable rams, each ram being operative upon individual actuation thereof to set the transmission to a correlated transmission ratio, the ram of the highest ratio being controlled by one of said pilot valves, gear shift valves individually connected to and operative to control the rams of the ratios other than the highest ratio and controlled by the other ones of said pilot valves, and fluid lines controlled by said one of said pilot valves and by said gear shift valves connecting said rams to said pressure controller, whereby the pressure supplied to the rams depends at least in part on the vacuum and therewith of driving torque exerted upon said transmission by the engine of the motor vehicle, a chamber associated with one of said gear shift valves, and at least one of said fluid lines communicating with said chamber, said last mentioned one of said gear shift valves controlling another one of said fluid lines and being operative to relieve said another one of said fluid lines when fluid under pressure is admitted to said chamber.

26. A control system for a motor vehicle transmission with a hydrodynamic clutch as claimed in claim 14, further comprising a plurality of fluid-operable rams, each ram being operative upon individual actuation thereof to set the transmission to a correlated transmission ratio, the ram of the highest ratio being controlled by one of said pilot valves, gear shift valves individually connected to and operative to control the rams of the ratios other than the highest ratio and controlled by the other ones of said pilot valves, fluid lines controlled by said one of said pilot valves and by said gear shift valves connecting said rams to said pressure controller, whereby the pressure supplied to the rams depends on the vacuum and therewith of driving torque exerted upon said transmission by the engine of the motor vehicle, and an additional fluid line connected to said pressure controller adapted to supply fluid to lubricating points and to said hydrodynamic clutch and to be opened by said pressure controller after all of said first mentioned lines have been opened by said pressure controller.

27. A control system as claimed in claim 10, further comprising a lever shiftable by the driver of the vehicle and operatively connected with said settable means, said lever being movable within either one of two parallel paths connected by a transverse path, and a spring-controlled detent for resiliently blocking said transverse path.

28. In a multi-speed transmission comprising change-speed gear means having a shaft rotating at a speed proportional to the speed of the vehicle, means for controlling the shifting operation of said transmission by a fluid under pressure, pressure step controller means, means for drivingly connecting said pressure step controller means to said change speed gear means, said pressure step controller means being operative to control the pressure of said fluid in successive steps dependent on the speed of rotation of said shaft, and means operatively connected with said pressure step controller means for selectively varying the control effect of said pressure step controller means to thereby vary the step-like successive changes of the pressure in said fluid.

29. The combination as defined in claim 28, wherein said last-mentioned means includes means for selectively disabling engagement of at least one of the transmission ratios of said change-speed gear by said means for controlling the shifting operation of said transmission.

30. In a multi-speed transmission comprising change-speed gear means having a shaft rotating at a speed proportional to the speed of the vehicle, pump means, pressure step controller means, means for drivingly connecting said pressure step controller means to said change speed gear means, said pressure step controller means being operative to control the pressure of said pump means in successive steps dependent on the speed of rotation of said shaft, and means for selectively varying the speed at which said pressure step controller means changes the pressure of said pump means in a step-like manner.

31. In a multi-speed transmission comprising change-speed gear means having a shaft rotating at a speed proportional to the speed of the vehicle, pump means for supplying a fluid under pressure, pressure step controller means, means operatively connected to said pump means for controlling the shifting operation of said transmission by said fluid, means for driving connecting said pressure step controller means to said change-speed gear means, said pressure step controller means being operative to control the pressure of said pump means in successive steps dependent on the speed of rotation of said shaft, and means operatively connected to said pressure step controller means for selectively varying the speed at which said pressure step controller means changes the pressure of said pump means in a step-like manner.

32. In a multi-speed transmission the combination according to claim 31 further comprising an engine connected with the input of said transmission for applying thereto torque, and means operative by the intake manifold vacuum and proportional at least in part in response to the torque thus produced by said engine for controlling the means for controlling the shifting operation of said transmission.

33. In a multi-speed transmission the combination according to claim 32 further comprising means for actuating said means for controlling the shifting operation of said transmission independently of the pressure of said fluid.

34. A control system for a multi-speed motor vehicle transmission having a plurality of step-like selectively engageable transmission ratios comprising a hydraulic shifting system operated by a hydraulic shifting medium and having a fluid-actuated shifting mechanism for controlling the shifting operation of the transmission ratios of said transmission in dependence on the pressure of said hydraulic shifting medium, means connected in said hydraulic shifting system for increasing the pressure of said hydraulic shifting medium in a step-like manner, and speed-responsive control means operated in dependence on the speed of the vehicle including a plurality of control elements successively operated one after another in dependence on said speed and a plurality of lines controlled by said control elements and connected with said first-mentioned means to thereby control said first-mentioned means over said lines by said successively operated control elements so as to increase the pressure of said hydraulic shifting medium in a step-like manner.

35. A control system according to claim 34, wherein said speed-responsive control means is formed as a centrifugal governor with said plurality of control elements thereof subjected to centrifugal forces and operative to close a corresponding number of said lines in a step-like manner to thereby control said first-mentioned means to open up the next line of the successively controlled lines as a result of an increase in pressure in said hydraulic shifting medium.

36. A control system according to claim 35 further comprising further control means operatively connected between said first-mentioned means and said speed responsive control means to open up only predetermined ones of said lines between said first-mentioned means and said speed-responsive control means so as to adjust thereby certain shifting ranges.

37. A control system according to claim 36, wherein said further control means is operative to alternately connect one and the same line section controlled by said first-mentioned means with different line sections controlled by said speed-responsive control means, and vice versa to connect one and the same line section controlled by said speed-responsive control means alternately with different line sections controlled by said first-mentioned means.

References Cited in the file of this patent

UNITED STATES PATENTS

| | | |
|---|---|---|
| 2,599,215 | Wemp | June 3, 1952 |
| 2,609,706 | Jandasek | Sept. 9, 1952 |
| 2,627,189 | McFarland | Feb. 3, 1953 |
| 2,630,895 | McFarland | Mar. 10, 1953 |
| 2,640,373 | Jandasek | June 2, 1953 |
| 2,644,559 | Randol | July 7, 1953 |

FOREIGN PATENTS

| | | |
|---|---|---|
| 503,755 | Belgium | June 30, 1951 |